United States Patent
Hecht

(10) Patent No.: US 11,167,735 B2
(45) Date of Patent: Nov. 9, 2021

(54) METHOD FOR OPERATING A BRAKE OF A MOTOR VEHICLE, VEHICLE CONTROL DEVICE AND VEHICLE

(71) Applicant: WABCO Europe BVBA, Brussels (BE)

(72) Inventor: Christian Hecht, Wunstorf (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 242 days.

(21) Appl. No.: 16/477,202

(22) PCT Filed: Jan. 19, 2018

(86) PCT No.: PCT/EP2018/051282
§ 371 (c)(1),
(2) Date: Jul. 11, 2019

(87) PCT Pub. No.: WO2018/149585
PCT Pub. Date: Aug. 23, 2018

(65) Prior Publication Data
US 2019/0359185 A1 Nov. 28, 2019

(30) Foreign Application Priority Data
Feb. 14, 2017 (DE) .................... 10 2017 001 417.5

(51) Int. Cl.
*B60T 7/04* (2006.01)
*B60T 8/171* (2006.01)
*B60T 8/172* (2006.01)

(52) U.S. Cl.
CPC .............. *B60T 7/042* (2013.01); *B60T 8/171* (2013.01); *B60T 8/172* (2013.01); *B60T 2220/04* (2013.01)

(58) Field of Classification Search
CPC .......... B60T 7/042; B60T 8/171; B60T 8/172; B60T 2220/04
See application file for complete search history.

(56) References Cited

U.S. PATENT DOCUMENTS

| | | | |
|---|---|---|---|
| 6,354,671 B1 | 3/2002 | Feldmann et al. | |
| 2005/0077780 A1* | 4/2005 | Robertson | B60T 13/74 303/7 |
| 2006/0076827 A1* | 4/2006 | Albright | B60T 8/323 303/123 |
| 2010/0222979 A1* | 9/2010 | Culbert | B60T 7/20 701/70 |
| 2014/0129108 A1 | 5/2014 | Grieser-Schmitz et al. | |
| 2015/0046056 A1* | 2/2015 | Schreiter | B60T 8/17 701/78 |

FOREIGN PATENT DOCUMENTS

| | | |
|---|---|---|
| DE | 102004058381 A1 | 3/2006 |
| DE | 102011016125 A1 | 10/2012 |
| DE | 102012003106 B3 | 3/2013 |
| EP | 1000830 A2 | 5/2000 |

* cited by examiner

*Primary Examiner* — Mary Cheung
(74) *Attorney, Agent, or Firm* — Leydig, Voit & Mayer, Ltd.

(57) ABSTRACT

A method for operating a brake of a motor vehicle with at least one electronic brake signal generator and with at least one brake control device for actuating the brake based on a brake signal of the brake signal generator includes transmitting the brake signal to the brake control device. The method additionally includes transmitting an actuation of the brake signal generator as a brake signal to the brake control device in addition to a brake pressure value.

18 Claims, 2 Drawing Sheets

METHOD FOR OPERATING A BRAKE OF A MOTOR VEHICLE, VEHICLE CONTROL DEVICE AND VEHICLE

CROSS-REFERENCE TO RELATED APPLICATIONS

This application is a U.S. National Stage Application under 35 U.S.C. § 371 of International Application No. PCT/EP2018/051282 filed on Jan. 19, 2018, and claims benefit to German Patent Application No. DE 10 2017 001 417.5 filed on Feb. 14, 2017. The International Application was published in German on Aug. 23, 2018, as WO 2018/149585 A1 under PCT Article 21(2).

FIELD

The invention concerns a method for operating a brake of a motor vehicle with at least one electronic brake signal generator, a vehicle control device, in particular a brake control device, and a vehicle with at least one brake signal generator and with at least one brake control device as a vehicle control device.

BACKGROUND

The complex control and regulation processes in electronic brake systems (EBS) of vehicles are usually carried out with the aid of suitable brake control devices. The brake systems in question here are usually embodied as pneumatic brake systems for heavier vehicles, such as trucks, buses and similar.

In addition to the control of the brake pressure for carrying out a braking process, in modern electronic brake systems as a rule there are at least anti-lock brake systems (ABS) and other safety and comfort functions. With such an ABS system, as with other brake systems, operation of a brake pedal by the driver as a braking demand is converted into a corresponding brake pressure. In order to now be able to realize functions such as in particular the ABS, it is necessary that the brake control device obtains information about relevant data, such as in particular the applied brake pressure.

Typically for this, measurement of the deflection caused by the driver of a brake pedal as a brake signal generator can be carried out. This measurement value is passed to the brake control device. In this case, the transmission of the brake signal is typically carried out as a duty cycle or a pulse width modulated signal (PWM) on a carrier frequency. The braking force that is to be set thereby results from the position of the brake signal generator. It is then transmitted as the brake signal to the brake control device.

SUMMARY

In an embodiment, the present invention provides a method for operating a brake of a motor vehicle with at least one electronic brake signal generator and with at least one brake control device for actuating the brake based on a brake signal of the brake signal generator. The method includes transmitting the brake signal to the brake control device and transmitting an actuation of the brake signal generator as a brake signal to the brake control device in addition to a brake pressure value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
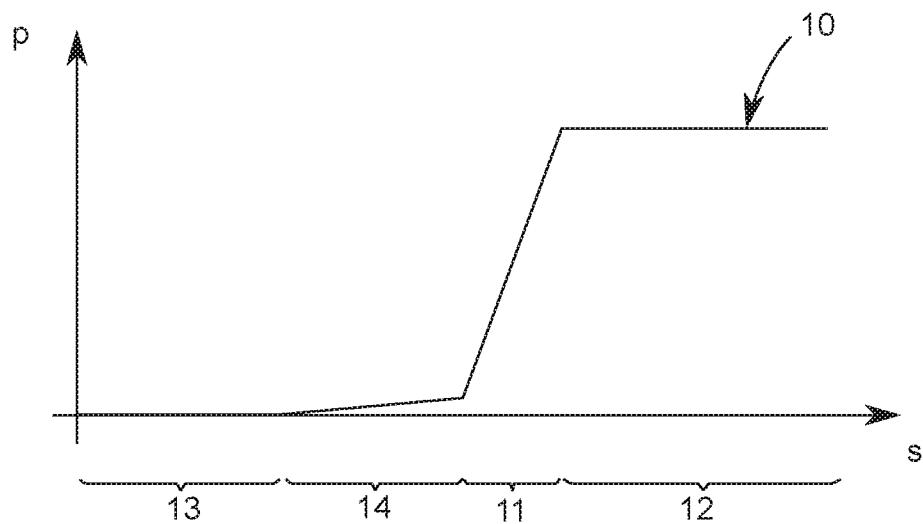
FIG. 1 shows a diagram that shows a brake pressure against a pedal pressure.

It is a disadvantage of known methods that small deflections of the brake signal generator can hardly be detected in practice or result in no significant brake pressure. This can lead to delays in the processing of the braking demand, in particular at the start of a braking process initiated by the driver. Moreover, with the known methods only one item of information for actuating the brake signal generator can be transmitted, namely either the deflection of the brake signal generator or the pressure or the speed of actuation.

Embodiments of the invention provide for the measurement and transmission of both a braking demand by the driver and the demanded brake pressure or the speed of operation of the brake pedal to a brake control device.

According to an embodiment of the invention, a method for operating a brake of a motor vehicle with at least one electronic brake signal generator is provided. A method for operating a brake of a motor vehicle is therefore provided with at least one electronic brake signal generator, in particular at least one brake pedal, and a brake control device for actuating the brake based on a brake signal of the brake signal generator, wherein the brake signal is transmitted to the brake control device. According to the invention, the method is characterized in that in addition to the brake pressure value the braking demand is also transmitted to the brake control device. It can thereby be ensured both that the requested braking force or the brake pressure is set and that the braking demand or the brake signal as such is signaled to the brake control device by operating the pedal. Thus advantageous effects, such as for example immediate activation of a brake light, of preparatory measures in the brake system for initiating the braking process and other effects can be implemented. As the brake signal with the brake pressure that is to be set is preferably already signaled by the brake signal generator, the braking demand can also additionally be transmitted with this. This ensures that all the information is transmitted with a single signal, namely the brake signal. As brake signals also experience preferred treatment on the vehicle bus as a rule, this also applies to the braking demand transmitted therewith.

The braking demand is preferably signaled in encoded form as a duty cycle by means of the brake signal. Encoding as a duty cycle enables transmission of the braking demand by means of the brake signal. For example, the presence or absence of a duty cycle or even a variation of the duty cycle can serve this purpose.

The braking demand is preferably signaled by means of the brake signal and encoded as a frequency modulation. Encoding as a duty cycle enables transmission of the braking demand by means of the brake signal. For example, the presence or absence of a duty cycle or even a variation of the duty cycle can serve this purpose.

In particular the deflection, more preferably the current deflection, in particular the total deflection, of the brake signal generator from the rest position thereof is signaled by means of the brake signal. This means that the relative position of the brake signal generator compared to the rest position is determined. A corresponding value for this, preferably a digital signal, is then transmitted by means of the brake signal to the brake control device. This enables a corresponding calculation and setting of the brake pressure value to be carried out.

Signaling both the braking demand or the actuation of the brake signal generator and the brake pressure value is carried out by means of the brake signal. Said signaling can preferably be carried out at the same time. All the information is thereby transmitted via one signal, namely via the brake signal. Thus, it is not necessary to analyze two different signals. The information is already fully present in the single brake signal.

The braking force that is to be set, in particular the brake pressure value, is preferably determined and/or signaled using the position of the brake signal generator. A slight actuation of the brake signal generator without significant brake pressure demand can thus already be signaled to the brake control device. The direct implementation of any actuation of a pedal, a switch arrangement, a handle or similar is thereby transmitted to the control unit to signal the braking demand. Instead of the traditional brake signal generator, other components may also be considered for this purpose. For example, distance sensors or similar can be used for determining a braking demand.

More preferably, the brake signal is modulated onto a carrier frequency. This enables simple and reliable transmission and detection of the signal to be carried out. In particular, this enables the encoding of measurement values, such as for example a pedal pressure or pedal stroke.

Particularly preferably, the carrier frequency of the brake signal is varied in the event of and/or during the actuation of the brake signal generator. Said variation can in particular be a function of the magnitude of the actuation of the brake signal generator. A proportional relationship between the actuation of the brake signal generator and the change in the carrier frequency can preferably be realized. The actuation of the brake signal generator is thereby additionally modulated onto the brake signal. In this case, measurement of the change in the carrier frequency is possible in a simple way in addition to a possible duty cycle. To vary the carrier frequency, the period duration or the cycle time of the periodic signal of the carrier frequency can be varied. In particular, an offset can be added to or subtracted from the respective cycle time for this.

The carrier frequency of the brake signal is preferably varied as a function of the magnitude or the speed of the actuation of the brake signal generator. In particular, said variation is carried out continuously. This enables a dependency of the carrier frequency of the brake signal on the actuation of the brake signal generator to be provided in addition. The brake control device can thus also determine the magnitude or the speed of the actuation.

The carrier frequency of the brake signal is preferably varied linearly or logarithmically as a function of the magnitude of the actuation of the brake signal generator. Both may be appropriate because of the usually linear movement of the brake signal generator in typical vehicle systems. In each case, optimum use of the resolution of the corresponding measurement arrangement is ensured thereby. Moreover, the analysis is accordingly possible in a simple way.

The frequency of the carrier signal is varied by up to 50% during actuation of the brake pedal. The variation preferably lies in the range between 5% and 50%. Particularly preferably, the variation lies in the range up to 10%. Such changes in the frequency can be measured well on the one hand. On the other hand, a minimal frequency shift can be provided as an offset for any actuation for secure reliable signaling of the braking demand. Reliable signaling is achieved thereby at even a small actuation by a frequency hop. Otherwise, the signaling can be signaled by a proportional, linear or even any other variation of the carrier frequency.

Particularly preferably, the carrier frequency of the brake signal is varied in the event of actuation of the brake signal generator. It is thus ensured that the modulation described above of the brake signal onto a carrier frequency in the event of actuation of the brake signal generator can transmit corresponding measurement values.

More preferably, the carrier frequency of the brake signal is increased in the event of activation of the brake signal generator. Conversely, the carrier frequency is preferably reduced in the event of deactivation of the brake signal generator. A direct relationship between the actuation of the brake signal generator and the associated measurement value can thus be achieved.

Particularly preferably, the actuation of the brake signal generator can be detected and signaled by means of the sensor for determining the magnitude of the actuation. This means that both the actuation of the brake signal generator as such and the magnitude and/or the speed thereof can be determined with the same sensor. Only the transmission to the brake control device may be carried out in a different way, preferably the braking demand as such on the one hand and the magnitude of the actuation of the brake signal generator on the other hand. On the one hand a duty cycle is adjusted and on the other hand a change in the carrier frequency is adjusted.

Alternatively, the actuation of the brake signal generator can be signaled by means of a sensor that is separate from the sensor for determining the brake pressure. This means that for example an additional switch or similar detects and signals the braking demand as such. Signalling the magnitude of the actuation of the brake signal generator can then be carried out by means of another, in particular known sensor. Thus different sensors or measurement transducers can produce the corresponding signals. This gives inter alia the advantage that a failure of one of the sensors can be detected for safety reasons.

According to an embodiment of the invention, a vehicle control device is provided. Such a vehicle control device, in particular a brake control device, is configured here for implementing the method described above. It is in particular characterized in that the braking demand is determined by the brake control device in addition to the brake pressure value. The remaining special implementations of the invention are in particular described above.

More preferably, at least one brake pedal and/or one brake lever is provided as the brake signal generator. Using said brake signal generator, the braking demand and also possibly the brake pressure can be specified by the driver.

According to an embodiment of the invention, a vehicle is provided with at least one brake signal generator and at least one brake control device as a vehicle control device according to the above descriptions.

The brake systems installed in the current vehicles are electronic brake systems (EBS). With heavy vehicles, such as in particular trucks and buses, pneumatic systems are predominant.

Such brake systems typically comprise different additional functions. An important additional function is the anti-lock braking system (ABS). However, other additional functions, such as for example anti-rollaway devices, starting aids and similar comfort functions are also implemented in this case.

Such electronic brake systems comprise at least one brake control device that controls all significant functions of the brake system. In particular, the brake pressures of the individual axles or wheels on the axles are controlled. With the comfort functions described above, corresponding modifications of the calculated brake pressures can then be carried out in order to meet these requirements.

In order to initiate a braking process, typically a braking demand by the driver of the vehicle is analyzed. This typically occurs because of the actuation of a brake signal generator by the driver, such as in particular a pedal, a handle or similar. Using the deflection of the brake signal generator, such as in particular the pedal pressure, the brake control device determines the necessary brake pressure.

The transmission of the pedal pressure or the position of the pedal is transferred for this purpose by means of a pulse width modulated signal (PWM signal) from the brake signal generator to the brake control device. For this purpose a corresponding signal is modulated onto a carrier frequency. By a variation of the pulse width, the actual pedal deflection or the pedal pressure can be transmitted in encoded form to the brake control device. A corresponding brake pressure p is then calculated as a function thereof and the pneumatic brake system is adjusted. A corresponding braking process is thus initiated.

In FIG. 1 a corresponding diagram of the brake pressure p against the pedal pressure or the pedal deflection s is shown. The profile of the corresponding curve or graph 10 shows an approximate step rise of the brake pressure p in the region of a flank 11. At larger pedal deflections s the brake pressure varies practically linearly in a region 12. Said region 12 corresponds exactly to the maximum brake pressure p that can be set in the specific system.

The region before the rise of the flank 11, i.e. with small pedal deflections s, is divided into two regions 13 and 14. In a first region 13 for deflections of the brake signal generator from the rest position at first no deflection can be detected. This is because a minimum amount of deflection is necessary to enable reliable measurement, encoding, transmission and analysis by the brake control device. Above a minimum value the brake pressure p rises linearly with a flat profile within the region 14 shown in the drawing.

Said non-linear profile of the brake pressure p represented by the profile in the graph 10 results in the detection of a braking demand only being carried out for a significant rise in the brake pressure p. The detection can still not be carried out in the prior art for only a slight actuation or at the start of actuation of the brake signal generator or the brake pedal. Rather, the region 13 represented in the drawing is to be assessed as an offset in which no braking demand can be detected. This then results in a corresponding delay also for all other brake functions, such as for example for the activation of brake lights or similar. Accordingly, a horizontal profile of the graph 10 is indicated in the region 13.

Figure 2:
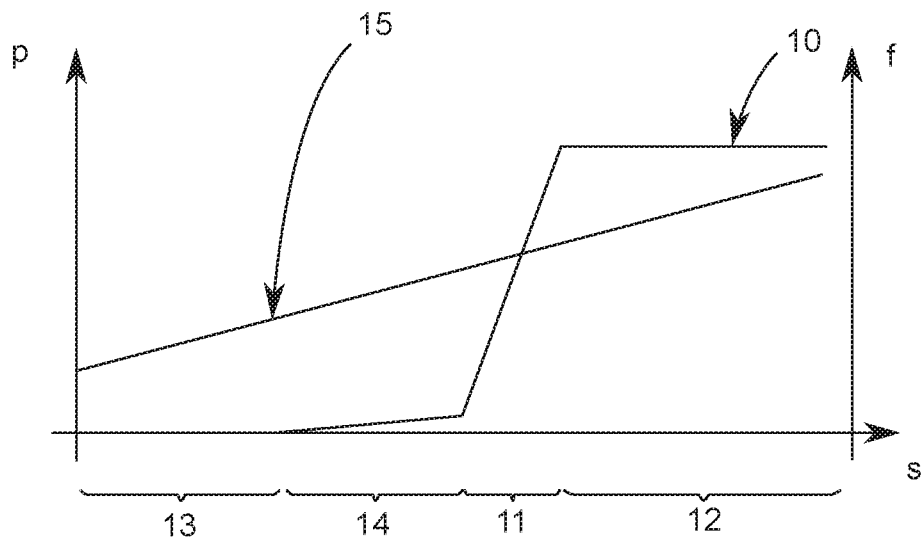
FIG. 2 shows a diagram according to FIG. 1 with a frequency shift as a function of pedal pressure additionally plotted.

FIG. 2 shows a second graph 15. This shows the frequency plotted on the vertical axis on the right side against the pedal deflection s. The profile of the graph 15 is linear with a vertical frequency offset plotted in the region of the origin of the horizontal axis. Accordingly, the entire actuation region of the brake signal generator can be used for detecting a braking demand. Even for the smallest deflections of the brake signal generator in the range of the measurement accuracy, the output of corresponding measurement values is already carried out. Accordingly, the entire range of movement of the brake signal generator can be used for detecting a braking demand by the driver.

The graph 15 is shifted upwards on the vertical axis by a vertical offset. This means that a minimum frequency is specified for the corresponding signal. Because of the offset in the frequency shift the braking demand can also be detected well in any case. With increasing pedal operation s, moreover, in this case the frequency of the signal varies linearly. This means that the carrier frequency of the brake signal varies as a function of the actuation of the brake signal generator. This is an increase in the frequency f with increasing actuation s of the brake signal generator.

Figure 3:
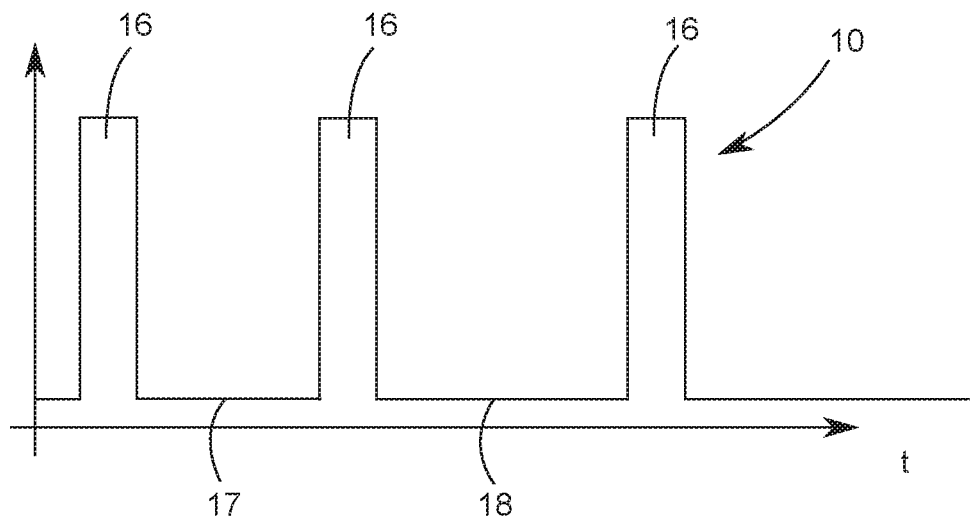
FIG. 3 shows a diagram for representing a pulse width modulation.

In FIG. 3 a pulse width modulation (PWM) for signaling the brake pressure is sketched. Three pulses 16 are shown in this case. As can be seen, the intervals between the pulses 16 are of different sizes. The intervals referred to here as pulse intervals 17 and 18 show by way of example that actuation of the brake signal generator, i.e. in particular the brake pedal, is signaled by different pulse intervals 17 or 18. The smaller pulse interval 17 for signaling an unactuated brake signal generator is shown here by way of example. Once actuation itself is carried out, the interval of the pulses 16 during the pulse width modulation is altered to the larger pulse interval 18.

The change of the period duration between the unactuated brake signal generator and the actuated brake signal generator is actually carried out using an offset that is subtracted from the normal cycle time. This results in a shortening of the cycle time with the signal generator unactuated. As soon as the brake signal transmitter is actuated, the normal cycle is set.

The variation of the period duration or the cycle time corresponds directly to a change in the frequency of the signal. By reducing the cycle time with the signal generator unactuated, the frequency is increased to the state with an actuated brake signal generator. In principle of course, the reverse process is also possible, and therefore a reduction of the frequency can also be carried out.

The length of the individual pulses 16, also referred to as the "high time", is kept constant as a rule in this case. The constant duration of the pulses 16 can thus be analyzed by the brake control device as a reference.

Figure 4:
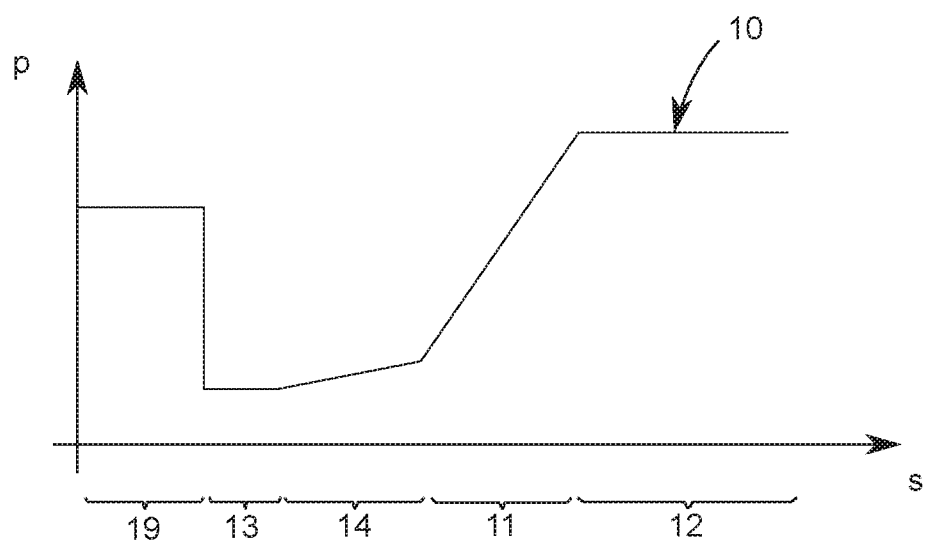
FIG. 4 shows a diagram of a brake pressure against a pedal pressure for signaling brake light information.

In FIG. 4 a corresponding diagram is shown that marks signaling of the pedal operation by a change in the period duration of the brake signal. Accordingly, in the event of a pedal operation a variation of the period duration and thereby the frequency of the signal occurs immediately. From this the brake control device can directly determine the braking demand. Instead of this, this would only be able to be carried out in the event of a further actuation of the brake signal generator, because signaling of small deflections is practically undetectable. Thus for example, immediate activation of a brake light or similar functions is enabled. Other measures can also be taken, such as certain switching processes for increasing the brake pressure, to prepare for braking or similar.

With the usual embodiment of the brake signal generator as a brake pedal, detection of the pedal deflection is carried out in steps. This is predetermined by the digital measurement. Typically, the range of values is 8 bits here, i.e. an increment between the values 0 and 255. Here each step typically corresponds to a difference of the deflection of the brake signal generator by 0.05 mm. In this specific example this results in a detectable maximum deflection of 127.5 mm. The corresponding values are of course adaptable to the specific embodiments. In particular, larger steps or even a higher or lower resolution can be provided, depending on the requirements of the individual application. Higher resolutions of 16 bits are also conceivable as are other step lengths, in particular from the range between 0.001 mm and 1 mm or even 0.01 mm and 0.1 mm.

In relation to the time offset an increment of 8 bits is also use here, i.e. likewise a range of values from 0 to 255. The individual steps typically correspond here to 5 µs. Thus, sufficiently accurate setting of the individual values can be carried out. Signaling can be ensured by sufficiently large differences. Here too higher or lower resolutions can be used, in particular 16 bits. The time intervals can typically vary between 0.1 µs and 100 µs, preferably between 1 µs and 10 µs.

Finally, in order to avoid false measurements the functions that are described here should be deactivated if the travel of the brake signal generator has been set to zero.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a brake of a motor vehicle with at least one electronic brake signal generator and with at least one brake control device for actuating the brake based on a brake signal of the brake signal generator, the method comprising:
    transmitting the brake signal to the brake control device; and
    transmitting an actuation of the brake signal generator as a brake signal to the brake control device in addition to a brake pressure value,
    wherein a total deflection or a current deflection of the brake signal generator from a rest position thereof is signaled by the brake signal.

2. The method as claimed in claim 1, wherein a braking demand is signaled by the brake signal in encoded form as a duty cycle.

3. The method as claimed in claim 1, wherein a braking demand is signaled by the brake signal in encoded form as a frequency modulation.

4. The method as claimed in claim 1, wherein simultaneous signaling both of the actuation of the brake signal generator and the brake pressure value is carried out by the brake signal.

5. The method as claimed in claim 1, wherein a braking force that is to be set is determined using a position of the brake signal generator.

6. The method as claimed in claim 1, wherein the brake signal is modulated onto a carrier frequency.

7. The method as claimed in claim 6, wherein the carrier frequency is varied in the event of and/or during the actuation of the brake signal generator.

8. The method as claimed in claim 7, wherein the carrier frequency of the brake signal is varied as a function of a magnitude or a speed of the actuation of the brake signal generator.

9. The method as claimed in claim 7, wherein the carrier frequency of the brake signal is varied linearly or logarithmically as a function of a magnitude of the actuation of the brake signal generator.

10. The method as claimed in claim 6, wherein the carrier frequency is varied in event of actuation of the brake pedal by about 5% to 50%.

11. The method as claimed in claim 6, wherein the carrier frequency is varied in event of the actuation of the brake signal generator.

12. The method as claimed in claim 1, wherein the actuation of the brake signal generator is detected and signaled by a sensor for determining a magnitude of the actuation.

13. The method as claimed in claim 1, wherein the actuation of the brake signal generator is detected and signaled by a sensor that is separate from a brake pressure transmitter.

14. The method as claimed in claim 1, wherein the at least one electronic brake signal generator is a brake pedal, and wherein a pressure of a pedal operation is signaled by a duty cycle of the brake signal.

15. A method for operating a brake of a motor vehicle with at least one electronic brake signal generator and with at least one brake control device for actuating the brake based on a brake signal of the brake signal generator, the method comprising:
    transmitting the brake signal to the brake control device; and
    transmitting an actuation of the brake signal generator as a brake signal to the brake control device in addition to a brake pressure value,
    wherein the brake signal is modulated onto a carrier frequency, and
    wherein the carrier frequency of the brake signal is increased in event of activation of the brake signal generator and reduced in event of deactivation of the brake signal generator.

16. A vehicle control device, comprising:
    an electronic brake signal generator configured to transmit an actuation of the electronic brake signal generator as a brake signal, in addition to a brake pressure value, to a brake control device; and the brake control device, the brake control device being configured to actuate a brake of the vehicle based on the brake signal transmitted by the brake signal generator, wherein a total deflection or a current deflection of the electronic brake signal generator from a rest position thereof is signaled by the brake signal.

17. The vehicle control device as claimed in claim 16, wherein at least one brake pedal and/or brake lever is provided as the at least one brake signal generator.

18. A vehicle, comprising:
the vehicle control device as claimed in claim 16; and
the brake.

* * * * *